United States Patent
Bromley (10) Patent No.: US 9,075,532 B1
(45) Date of Patent: Jul. 7, 2015

(54) SELF-REFERENTIAL DEDUPLICATION

(75) Inventor: Graham Bromley, Dublin, CA (US)

(73) Assignee: Symantec Corporation, Mountain View, CA (US)

( * ) Notice: Subject to any disclaimer, the term of this patent is extended or adjusted under 35 U.S.C. 154(b) by 775 days.

(21) Appl. No.: 12/766,177

(22) Filed: Apr. 23, 2010

(51) Int. Cl.
*G06F 12/00* (2006.01)
*G06F 13/00* (2006.01)
*G06F 13/28* (2006.01)
*G06F 3/06* (2006.01)
*G06F 11/14* (2006.01)

(52) U.S. Cl.
CPC ............ *G06F 3/0641* (2013.01); *G06F 3/0608* (2013.01); *G06F 3/067* (2013.01); *G06F 11/1453* (2013.01)

(58) Field of Classification Search
CPC .................... G06F 3/0641; G06F 11/1453
See application file for complete search history.

(56) References Cited

U.S. PATENT DOCUMENTS

| | | | |
|---|---|---|---|
| 5,990,810 A | 11/1999 | Williams | 341/51 |
| 7,822,939 B1* | 10/2010 | Veprinsky et al. | 711/170 |
| 7,921,086 B1* | 4/2011 | Bromley et al. | 707/692 |
| 8,234,468 B1 | 7/2012 | Deshmukh et al. | 711/162 |
| 8,280,854 B1* | 10/2012 | Emmert | 707/664 |
| 2008/0244204 A1* | 10/2008 | Cremelie et al. | 711/162 |
| 2008/0310628 A1 | 12/2008 | Fujioka et al. | 380/201 |
| 2009/0083563 A1* | 3/2009 | Murase | 713/324 |
| 2010/0031086 A1* | 2/2010 | Leppard | 714/15 |
| 2010/0058013 A1* | 3/2010 | Gelson et al. | 711/162 |
| 2010/0077013 A1 | 3/2010 | Clements et al. | 707/822 |
| 2010/0077161 A1* | 3/2010 | Stoakes et al. | 711/162 |
| 2010/0094817 A1 | 4/2010 | Ben-Shaul et al. | 707/697 |
| 2010/0106754 A1 | 4/2010 | Condit et al. | 707/822 |
| 2010/0198797 A1* | 8/2010 | Wideman | 707/692 |
| 2011/0099154 A1 | 4/2011 | Maydew et al. | 707/692 |
| 2011/0231362 A1 | 9/2011 | Attarde et al. | 707/609 |

(Continued)

OTHER PUBLICATIONS

Karr et al., Copending U.S. Appl. No. 13/716,123 entitled "Deduplication Featuring Variable-Size Duplicate Data Detection and Fixed-Size Data Segment Sharing," filed Dec. 15, 2012.

*Primary Examiner* — Yaima Rigol
(74) *Attorney, Agent, or Firm* — Campbell Stephenson LLP (57) ABSTRACT

A first value is calculated as a function of data in an $n^{th}$ data block of a backup copy. The first value is then compared with each of a plurality of values in a plurality of entries, respectively, of a first data structure. The plurality of entries in the first data structure include a plurality of pointers, respectively, that correspond to a plurality of data blocks, respectively, in a storage system. If the first value compares equally to a value contained in one of the plurality of entries of the first data structure, a pointer of the one entry is added to an $n^{th}$ entry of a second data structure. This pointer corresponds to a copy of the $n^{th}$ data block that is stored in the storage system. If the first value does not compare equally with any value contained in the plurality of entries of the first data structure, (1) the $n^{th}$ data block is stored in the storage system, and (2) a first pointer is added to the $n^{th}$ entry of the second data structure. The first pointer corresponds to the $n^{th}$ data block that is stored in the storage system. Eventually the second data structure is stored in the storage system after adding the pointer or the first pointer to the $n^{th}$ entry.

20 Claims, 8 Drawing Sheets

(56) References Cited

U.S. PATENT DOCUMENTS

| | | | |
|---|---|---|---|
| 2011/0307447 A1 | 12/2011 | Sabaa et al. | 707/637 |
| 2012/0036319 A1 | 2/2012 | Bondurant | 711/111 |
| 2012/0124011 A1 | 5/2012 | Spackman et al. | 707/292 |

\* cited by examiner

| Block # | Identity | Offset |
|---|---|---|
| 0 | I.data1.ID | 0 |
| 1 | I.data1.ID | 1 |
| 2 | I.data1.ID | 2 |
| 3 | I.data1.ID | 3 |
| 4 | I.data1.ID | 1 |
| . | . | . |
| . | . | . |
| S | I.data1.ID | 512 |

| Block # | Identity | Offset |
|---|---|---|
| 0 | I.data3.ID | 20 |
| 1 | I.data1.ID | 7 |
| 2 | I.data7.ID | 12 |
| 3 | I.data1.ID | 0 |
| 4 | I.data20.ID | 212 |
| . | . | . |
| . | . | . |
| t | I.data5.ID | 75 |

*Fig. 6*

| Entry | I.data(x).SA | I.map(x).SA | I.refTo(x).SA | I.refFrom(x).SA |
|---|---|---|---|---|
| 1 | I.data1.SA | I.map1.SA | I.refTo1.SA | I.refFrom1.SA |
| 2 | I.data2.SA | I.map2.SA | I.refTo2.SA | I.refFrom2.SA |
| 3 | I.data3.SA | I.map3.SA | I.refTo3.SA | I.refFrom3.SA |
| . | . | . | . | . |
| 600 | I.data600.SA | I.map600.SA | I.refTo600.SA | I.refFrom600.SA |

Fig. 10

SELF-REFERENTIAL DEDUPLICATION

BACKGROUND OF THE INVENTION

Deduplication can reduce the size of backup copies of data objects such as files systems, thereby making more efficient use of network resources. Deduplication reduces backup copy size by eliminating duplicated data. Only one unique copy of multiple instances of the same data is actually retained on a backup storage device, such as disk or tape storage. For example, a typical file system might contain 100 instances of the same one megabyte (MB) file. If the file system is copied to backup storage, all 100 instances are saved. With deduplication, only one instance of the file is copied to backup storage; each subsequent instance is referenced back to the one saved copy. In this example, a 100 MB backup storage demand could be reduced to one MB. Deduplication can also reduce the throughput requirements of a data communication link (e.g., a wide area network or WAN) coupled to backup storage; less bandwidth is needed for the WAN to transmit one MB to/from backup storage when compared to the requirements needed to transmit 100 MB.

Deduplication generally operates at the file or block level. File deduplication eliminates duplicate files, but this is not a very efficient means of deduplication. Block deduplication looks within a file and saves unique instances of each block portion of a predetermined size (e.g., 512 bits). If a file is subsequently updated, only the changed data is saved during the next backup operation. That is, if only a few bits of a file are changed, then only the changed blocks are saved, the changes do not constitute an entirely new file. This behavior makes block level deduplication far more efficient. Various embodiments of deduplication will be described herein with reference to block level deduplication of file system backup copies. However, the deduplication described herein may be employed with respect to data objects other than file system backup copies.

Cloud storage services are becoming popular. In the context of enterprise backup, file systems are typically much too large to permit reasonable backup durations, and some form of deduplication may be needed. A cloud storage service might implement deduplication, but this is only a convenience for the cloud storage service provider and does not address critical problems such as throughput to the cloud storage service over a WAN as experienced by a data protection application such as backup/restore.

Data deduplication could be implemented inline between the backup/restore application and the cloud storage service. However, in this embodiment, data passes through inline deduplication to and from the cloud storage service. Inline deduplication may be limiting in several ways. In particular, all involved backup and restore must be accessible from the device (e.g., an appliance) that implements deduplication, and thus a file system cannot be restored absent the inline data deduplication appliance. This can be difficult, especially in the context of restoration after data corruption, given that successful restoration is entirely dependent on proper functioning and data integrity of the inline deduplication appliance.

SUMMARY OF THE INVENTION

A method is disclosed in which a first value is calculated as a function of data in an $n^{th}$ data block of a backup copy. The first value is then compared with each of a plurality of values in a plurality of entries, respectively, of a first data structure. The first data structure includes a plurality of pointers, respectively, that correspond to a plurality of data blocks, respectively, in a storage system. If the first value compares equally to a value contained in one of the plurality of entries of the first data structure, a pointer of the one entry is added to an $n^{th}$ entry of a second data structure. This pointer corresponds to a copy of the $n^{th}$ data block that is stored in the storage system. If the first value does not compare equally with any value contained in the plurality of entries of the first data structure, (1) the $n^{th}$ data block is stored in the storage system, and (2) a first pointer is added to the $n^{th}$ entry of the second data structure. The first pointer corresponds to the $n^{th}$ data block that is stored in the storage system. Eventually the second data structure is stored in the storage system after adding the pointer or the first pointer to the $n^{th}$ entry. In some embodiments a first computer system calculates the first value, a second computer system accesses the first data structure using the first value, and the first and second computer systems are coupled together via a communication link. In some embodiments the first computer system generates and sends a request to the second computer system via the communication link, the request comprising the first value. In some embodiments at least one data block of the backup copy is stored as part of a first data object in the storage system. In some embodiments the first data object and the second data structure is migrated to a second storage system. In some embodiments the backup copy is recreated using the first data object and the second data structure of the second storage system. In some embodiments at least one other data block of the backup copy is stored as part of a first data object in the storage system, and wherein the method further comprises the first computer system recreating the backup copy using the first data object and the second data structure, wherein the first computer system recreates the backup copy independent of the second computer system. In some embodiments the first pointer enables a computer system to retrieve the nth data block from the storage system without referencing the first data structure, and the pointer enables the computer system to retrieve the copy of the nth data block from the storage system without referencing the first data structure.

A computer readable medium is disclosed that contains program instructions that are executable by one or more processors, which implement a method in response to executing the instructions. The method, when implemented, may include an act of calculating a first value as a function of data in an $n^{th}$ data block of a backup copy. If the first value compares equally to a value contained in one of a plurality of entries of a first data structure, a pointer of the one entry is added to an $n^{th}$ entry of a second data structure, wherein the pointer corresponds to a copy of the $n^{th}$ data block that is stored in a storage system. If the first value does not compare equally with any value contained in the plurality of entries of the first data structure, (1) the $n^{th}$ data block is stored in the storage system, and (2) a first pointer is added to the $n^{th}$ entry of the second data structure, wherein the first pointer corresponds to the $n^{th}$ data block that is stored in the storage system. The second data structure is stored in the storage system after adding the pointer or the first pointer to the $n^{th}$ entry. In some embodiments the first value is compared with each of a plurality of values in the plurality of entries, respectively, of the first data structure, the plurality of entries comprising a plurality of pointers, respectively, which correspond to a plurality of data blocks, respectively, in a storage system. In some embodiments, the first pointer enables a computer system to retrieve the nth data block from the storage system without referencing the first data structure, wherein the pointer enables the computer system to retrieve the copy of the $n^{th}$ data block from the storage system without referencing the first data structure. In some embodiments, at least one data block of the backup copy is stored as part of a first data object in the storage system. In some embodiments, the backup copy is recreated using the second data structure and the first data object. In some embodiments, a request comprising the first value is generated and sent.

An apparatus is disclosed that may include a first computer system coupled to a second computer system via a communication link. The first computer system is configured to calculate a first value as a function of data in an $n^{th}$ data block of a backup copy. The second computer system is configured to compare the first value with each of a plurality of values in a plurality of entries, respectively, of a first data structure. The plurality of entries include a plurality of pointers, respectively, that correspond to a plurality of data blocks, respectively, in a storage system. If the first value compares equally to a value contained in one of the plurality of entries of the first data structure, the first computer system is configured to add a pointer of the one entry to an $n^{th}$ entry of a second data structure, wherein the pointer corresponds to a copy of the $n^{th}$ data block that is stored in the storage system. If the first value does not compare equally with any value contained in the plurality of entries of the first data structure, the first computer system is configured to (1) store the $n^{th}$ data block in the storage system, and (2) add a first pointer to the $n^{th}$ entry of the second data structure, wherein the first pointer corresponds to the $n^{th}$ data block that is stored in the storage system. The first computer system is also configured to store the second data structure in the storage system after adding the pointer or the first pointer to the $n^{th}$ entry. In some embodiments, the first computer system is configured to generate and send a request to the second computer system via the communication link, the request comprising the first value. In some embodiments, the first computer system is configured to store a first data object in the storage system wherein at least one other data block of the backup copy is contained in the first data object, and wherein the first computer system is configured to recreate the backup copy using the first data object and the second data structure, wherein the first computer system recreates the backup copy independent of the second computer system. In some embodiments, the first pointer enables a computer system to retrieve the nth data block from the storage system without referencing the first data structure, and the pointer enables the computer system to retrieve the copy of the nth data block from the storage system without referencing the first data structure. In some embodiments, a third computer system is configured to migrate the first data object and the second data structure from the storage system to a second storage system. In some embodiments, a fourth computer system configured to recreate the backup copy using the first data object and the second data structure of the second storage system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
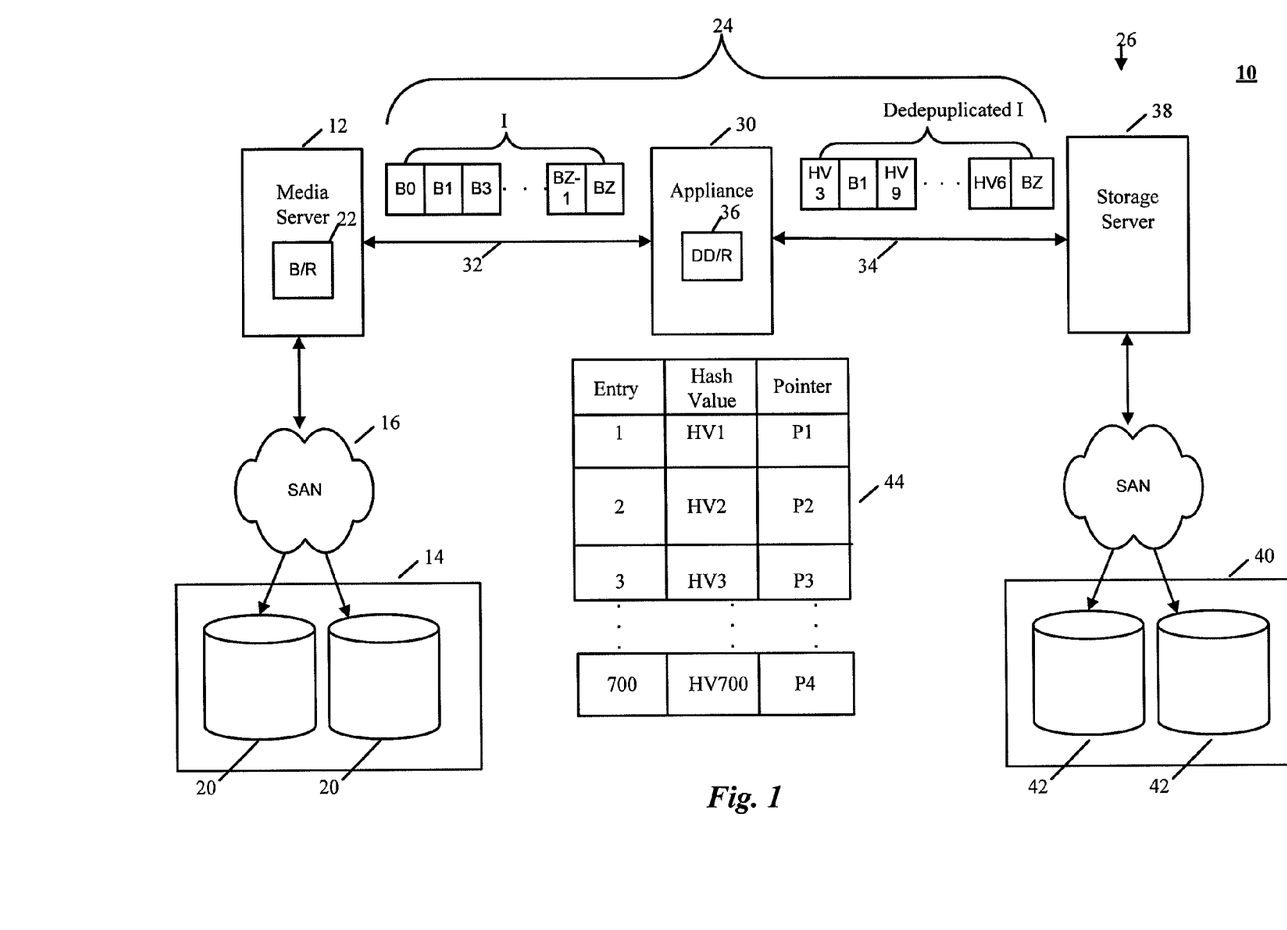
FIG. 1 graphically illustrates relevant components of an example system that employs data deduplication.

FIG. 1 illustrates in block diagram form relevant components of a networked system 10 that employs deduplication. The resources of system 10 include a media server 12 coupled to primary storage 14 via a storage area network (SAN) fabric that may include multiple components such as switches, routers, bridges, etc. Primary storage 14 includes one or more storage devices (e.g., disk arrays) 20 that store a file system F. Although not shown, client computer systems can access data of file system F via media server 12.

Media server 12 includes a data protection module 22. For purposes of explanation only, data protection module 22 will take form in backup/restore (B/R) module 22, it being understood that the term data protection should not be limited thereto. Backup and restore operations are well known in the art. B/R module 22 creates backup copies of file system F at regularly scheduled intervals (e.g., every Sunday at 2 a.m.). When needed, B/R module 22 can restore file system F, or a portion thereof, to a prior data state using any one of the previously created backup copies, or portions thereof.

With continued reference to FIG. 1, a data path 24 couples B/R module 22 to a backup system (e.g., a cloud storage system) 26. This data path 24 includes an appliance 30 coupled between communication link 32 and WAN 34. Although not shown, WANs may include several components such as switches, routers, etc., which operate in concert to transmit data. Appliance 30 implements a deduplication/reflation (DD/R) module 36 more fully described below. In one embodiment, DD/R module 36 takes form in instructions executing on one or more processors. DD/R module 36 can deduplicate backup copies of file system F, and DD/R module 36 can recreate the backup copies by "reflating" deduplicated backup copies, or portions thereof. Reflated backup copies should be identical to original backup copies, and can be used by B/R module 22 to restore file system F, or portions thereof, to a prior state.

Backup system 26 stores deduplicated backup copies of file system F and includes a storage server 38 coupled to backup storage 40 via a SAN fabric that may include multiple components such as switches, routers, bridges, etc. Backup storage 40 may include one or more storage devices (e.g., disk arrays) 42 that store deduplicated backup copies of file system F. DD/R module 36 may retrieve deduplicated backup copies from backup storage 40 as needed.

During a backup operation, DD/R module 36 receives a backup copy of file system F in block-by-block fashion from B/R module 22 via communication link 32. FIG. 1 shows a graphical illustration of an example backup copy I. DD/R module 36 deduplicates the backup copy using a hash algorithm (e.g., MD5 or SHA-1, not shown) and a hash table such as hash table 44 graphically shown in FIG. 1. Hash table 44 contains a plurality of entries, each of which includes a unique hash value and pointer that directly or indirectly points to a location in backup storage 40 where a respective data block can be accessed.

DD/R module 36's hash algorithm generates a hash value K for each data block in the backup stream received from B/R module 22 during a backup operation. The hash algorithm should generate identical hash values for identical data blocks (i.e. data blocks that are identical copies of each other), and the hash algorithm should generate distinct hash values for data blocks that are different (i.e. data blocks that are not identical copies of each other). DD/R module 36 compares each generated hash value K with the hash values stored in table 44. If the generated hash value K compares equally to one of the stored hash values, the data block is duplicated in backup storage 40. In this situation, there is no need to store another instance of the data block, and accordingly the data block is removed from backup copy I and replaced with the entry number of table 44 that contains the matching hash value or the matching hash value itself. FIG. 1 shows graphical illustration of an example deduplicated backup copy as it is transmitted between DD/R module 36 and storage server 38 via WAN 34. In this example, some of the original data blocks of backup copy I are replaced by hash values from table 44.

If the generated hash value K does not compare equally with a hash value in table 44, the data block is deemed the initial instance (i.e., it is not duplicated in backup storage), and it is eventually stored in backup storage 40 as part of the deduplicated backup copy. Moreover, DD/R module 36 updates hash table 44 by adding a new entry that contains the newly generated hash value and a new pointer, which directly or indirectly identifies a location in backup storage 40 where the corresponding data block can be accessed.

The file system F stored in primary storage 14 is subject to data corruption, which can occur as a result of hardware, software or human error. When corruption occurs, B/R module 22 can restore file system F to a prior point-in-time using one of the backup copies, which can be recreated by reflating a corresponding deduplicated backup copy. Reflation begins after DD/R module 22 receives a request for a particular backup copy from B/R module 22. In response to this request, DD/R module 36 retrieves a corresponding deduplicated backup copy from backup storage 40 via server 38. DD/R module 36 analyzes each element of the deduplicated backup copy. If the element is a data block, the data block is passed to B/R module 22 as part of the recreated backup copy. If the element is a hash value or hash table entry number, DD/R module 36 accesses hash table 44 using the hash value or entry number. In response hash table 44 returns a pointer from the entry that contains the matching hash value or hash table entry number. DD/R uses the pointer to retrieve the corresponding data block via server 38. The retrieved data block replaces the hash value or hash table entry number in the deduplicated backup copy, and is passed to B/R module 22 as part of the recreated backup copy. Ultimately, DD/R module 36 provides the recreated backup copy to B/R module 22 in a block-by-block fashion. This recreated backup copy should be identical to the backup copy requested by B/R module 22.

Reflation is entirely dependent on appliance 30 and its components including DD/R module 36 and hash table 44. DD/R module references hash table 44 using hash values or hash table entry numbers of the deduplicated backup copy to retrieve corresponding pointers, which in turn are used to retrieve corresponding data blocks from backup storage 40. DD/R module 36 cannot reflate the deduplicated backup copy without referencing hash table 44. If hash table 44 loses integrity or accessibility, deduplicated backup copies cannot be reflated. Further, if appliance 30 and/or DD/R module 36 is not functioning properly, the deduplicated backup copy cannot be reflated.

Figure 2:
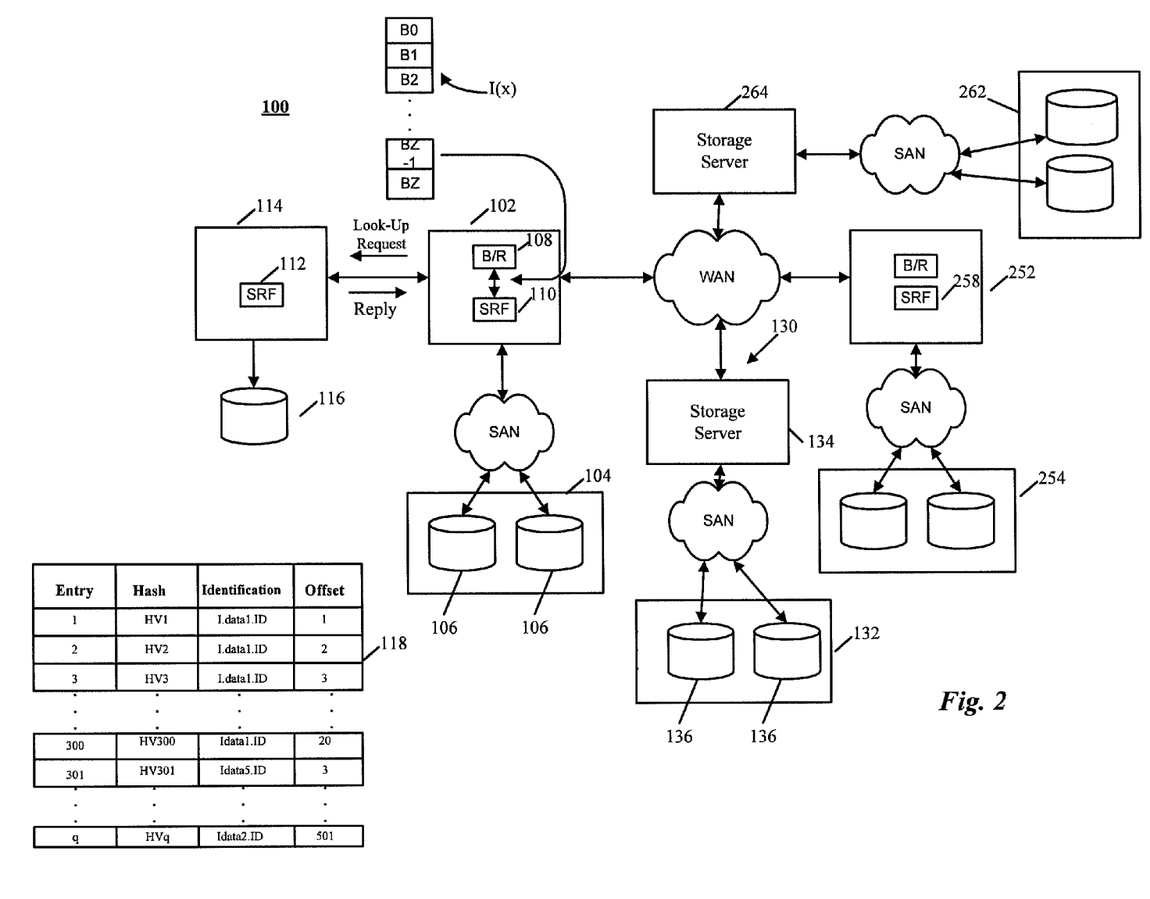
FIG. 2 graphically illustrates relevant components an example system that employs data deduplication.

FIG. 2 illustrates in block diagram form relevant components of another networked system 100 that implements deduplication. Networked system 100 includes a primary media server 102 coupled to a primary storage system 104 via a SAN fabric that may include multiple components such as switches, routers, bridges, etc. Primary storage 104 includes one or more storage devices (e.g., disk arrays) 106 that store a file system F. Although not shown, client computer systems can access data file system F via primary media server 102.

Primary media server 102 includes a data protection module 108. For purposes of explanation only, the data protection module takes form in a B/R module 108, it being understood that the term data protection module should not be limited thereto. In this embodiment, B/R module 108 takes form in instructions that execute on one or more processors. At regularly scheduled intervals B/R module 108 creates a backup copy of file system F. During the backup process, B/R system 108 generates a stream of data blocks that represent a copy of file system F. When needed (e.g., after data corruption of file system F), B/R module 108 can restore file system F, or a portion thereof, in block-by-block fashion using one of the previously created backup copies, which can be recreated from deduplications thereof as more fully described below.

Primary media server 102 also includes a self-referential filter (SRF) module 110, which may take form in instructions executing on one or more processors. SRF module 110 is in data communication with a self-referential monitor (SRM) module 112, which may take form in instructions executing on one or more processors of computer system 114. SRF module 110 acting in concert with SRM module 112, can deduplicate backup copies of file system F as they are created by B/R module 108. In addition SRF module 108 can recreate the backup copies by reflating respective deduplicated backup copies. The resulting recreated backup copies should be identical to respective backup copies originally created by B/R module 108, and B/R module 108 can use a recreated backup copy to restore file system F, or a portion thereof, to a prior data state. SRF module 110 can reflate deduplicated backup copies independent of SRM module 112. In other words, SRM module 112 is not needed to reflate deduplicated backup copies of file system F; SRM module 112 is typically only needed to deduplicate backup copies.

Data of deduplicated backup copies created by SRF module 110 and SRM module 112, may be self-referential (SR) in nature. SR deduplication can be distinguished from other forms of deduplication by one or more characteristics: (1) metadata that is needed to reflate a deduplicated backup copy is stored with or as part of the SR deduplicated backup copy, (2) a dedicated system (e.g., computer system 114) that implements SRM module 112, more fully described below, is not inline or within the datapath to the backup storage, and (3) once a backup copy is deduplicated, it can be migrated to other storage media while in the deduplicated state. These characteristics are more fully described below.

Returning to FIG. 2, SRM module 112 is in data communication with a hash table, which is maintained in local storage device (e.g., disk array) 116. FIG. 2 illustrates a graphical representation of an example hash table 118. SRM module 112 references hash table 118 during duplication of a backup copy as will be more fully described below. Importantly, hash tale 118 need not be referenced during reflation as will be more fully described below.

Hash table 118 includes a plurality of entries, each of which includes a unique hash value, an identification (e.g., I.data1.ID) of a data object (e.g., I.data1) that stores original instances of data blocks, and an offset number that identifies a position of a data block within the data object. The entry's combination of identification and offset block number, creates a pointer that directly or indirectly identifies a location in backup storage where a respective data block can be accessed and retrieved as will be more fully described below.

During a regularly scheduled backup operation, SRF module 110 receives a backup copy of file system F in block-by-block fashion from B/R module 108. FIG. 2 shows a graphical illustration of an example backup copy I(x), where x is a variable. SRF module 110 acting in concert with SRM module 112 deduplicates the backup copy I(x) using a hash algorithm (e.g., MD5 or SHA-1) and hash table 118. The resulting SR deduplicated backup copy is transmitted to a backup system 132 where it is stored in backup storage 132. In one embodiment, as more fully described below, the SR deduplicated backup copy may take form in a collection of data objects, some of which may contain the metadata, mentioned above, that is needed for reflation.

SRF module 110 can recreate the backup copies of file system F by reflating respective deduplicated backup copies, or portions thereof, which are contained in backup storage 132. The recreated backup copies should be identical to respective original backup copies, and can be used by B/R module 108 to restore file system F, or portions thereof, to a prior state. Because the SR deduplicated backup copies are self-referential, they can be reflated solely by SRF module 110 or another similar SRF module. In other words, neither computer system 114, including SRM module 112 nor hash table 118, is needed to reflate an SR deduplicated backup copy.

While FIG. 2 shows SRF module 110 implemented on primary media server 102, SRF module 110 could be implemented in an appliance or computer system that is within a datapath coupled between primary media server 102 and backup system 130 that stores SR deduplicated backup copies. In this alternative embodiment, primary media server 102 is not burdened with the data processing demands of an SRF module during deduplication of backup copies or during reflation of an SR deduplicated backup copy. Further, FIG. 2 shows SRF module 110 and SRM module 112 implemented on separate computer systems. In an alternative embodiment, SRF module 110 and SRM module 112 could be implemented on a single computer system in, for example, a cloud computing environment. Moreover, SRF module 110 and SRM module 112 could be integrated into a single module implemented in a single computer system.

Figure 3:
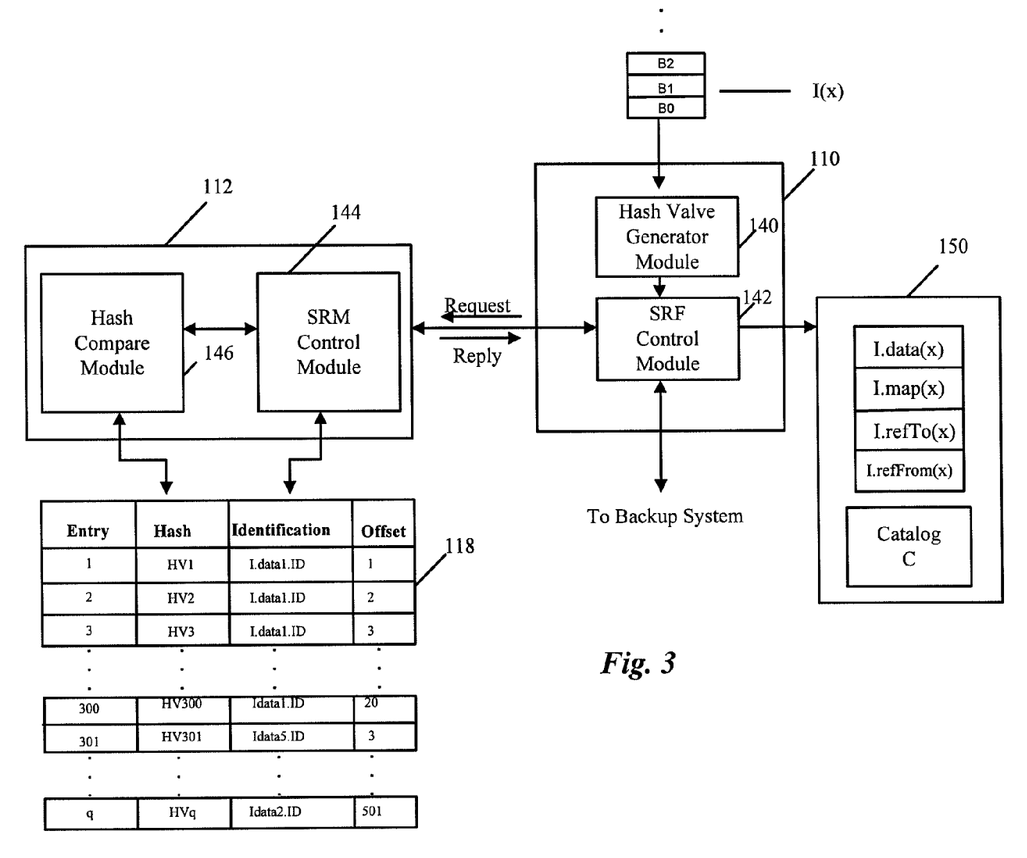
FIG. 3 graphically illustrates relevant components of the example system shown in FIG. 2.
Figure 4:
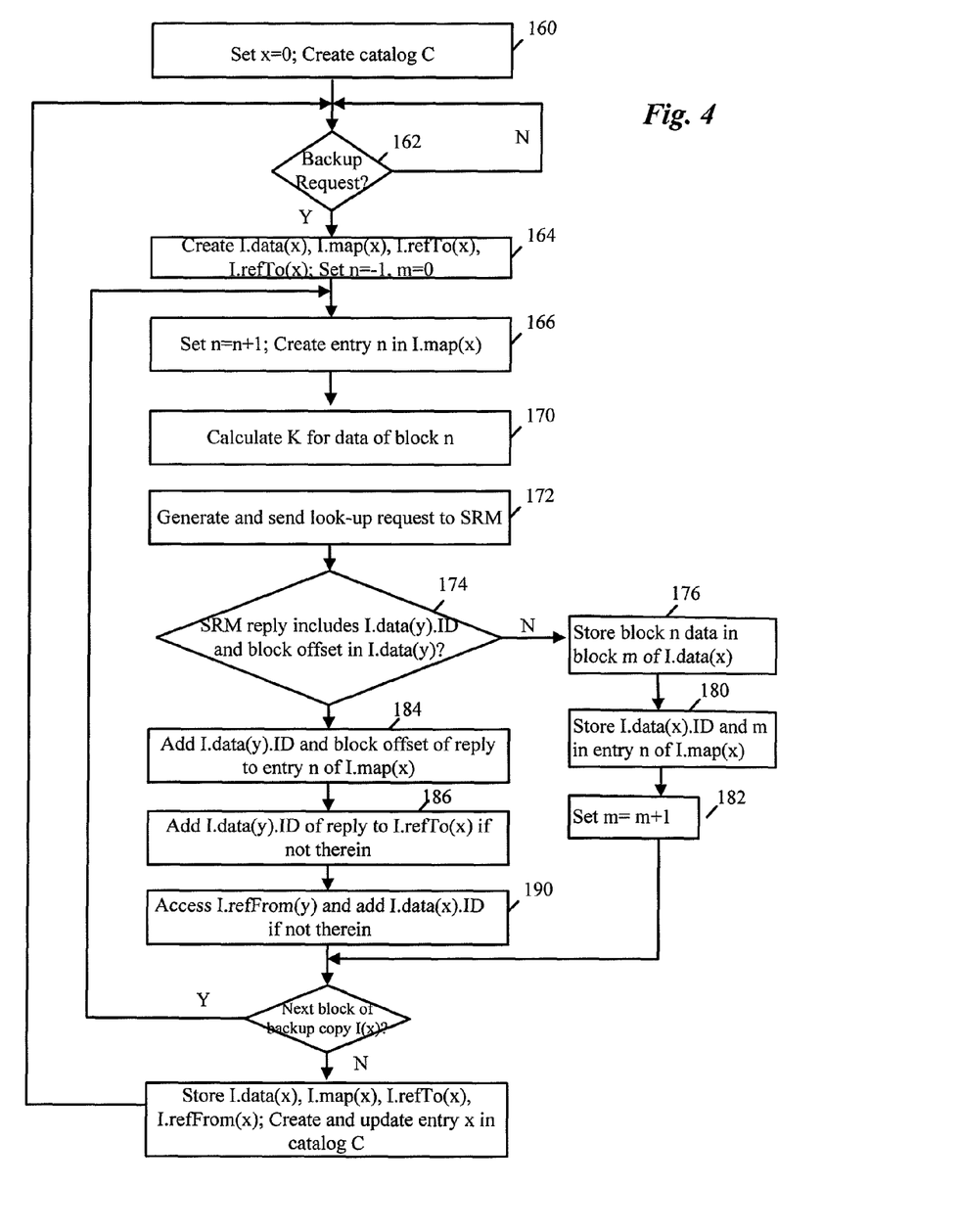
FIG. 4 is a flow chart that illustrates relevant aspects of a process implemented by a computer system in FIG. 2.
Figure 5:
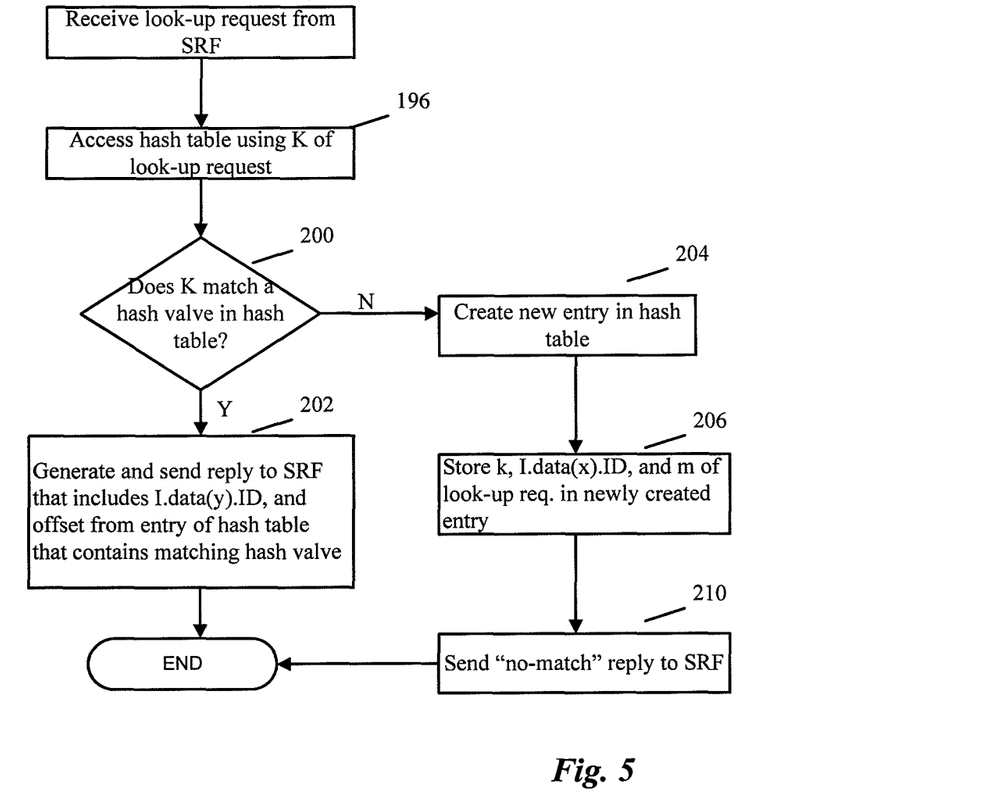
FIG. 5 is a flow chart that illustrates relevant aspects of a process implemented by a computer system in FIG. 2.

FIG. 3 shows a more detailed view of SRF module 110 and SRM module 112. More particularly, FIG. 3 shows that SRF module 110 includes a hash value generator module 140 coupled to an SRF control module 142. FIG. 3 also shows that SRM module 112 includes an SRM control module 144 coupled to a hash value compare module 146. With continuing reference to FIGS. 2 and 3, FIGS. 4 and 5 contain flow charts that illustrate relevant aspects of example processes implemented by SRF module 110 and SRM modules 112, respectively, during deduplication. In FIG. 4 SRF control module 142, as shown in step 160, initially sets a variable x to 0. This variable x can used to track backup copies I(x) and their respective SR deduplicated backup copies. Additionally, SRF control module 142 may create a catalog C, which can be stored in backup storage 132 and retrieved therefrom as needed. Catalog C should have an entry x for each backup copy I(x) of file system F. As will be more fully described below, Catalog C may store information that is relevant to the deduplication and/or reflation processes.

With the initial or each subsequent backup operating, SRF control module 142 in step 164 creates I.data(x) and I.map(x). In one embodiment, these data objects are initially created in memory 150 that is local to SRF control module 142. I.data(x) and I.map(x) are initially empty, but as will be more fully described below I.data(x) will eventually store some, but not all data blocks (i.e., first instances) of backup copy I(x), and I.map(x) will eventually store pointers that identify storage locations where blocks of backup copy I(x) can be found, which can be used by an SRF module (e.g., SRF module 110) to reflate the corresponding SR deduplicated backup copy. In one embodiment, non-duplicated (i.e. first instance) data blocks of backup copy I(x) are added to I.data(x) while held in memory 150, and SRF control module 142 eventually writes I.data(x) to backup storage 132 when the deduplication process for backup copy I(x) is complete. In an alternative embodiment non-deduplicated data blocks are added to I.data (x) while it is stored in backup storage 132.

SRF control module 142 may optionally create I.refTo(x) and I.refFrom(x). In one embodiment, these data objects are initially created in memory 150. I.refTo(x) and I.refFrom(x) are initially empty, but as will be more fully described below I.refTo(x) will eventually store I.data(z).ID, the identity of each I.data(z) that is referenced in I.map(x), and I.refFrom(x) will eventually store the identity of each I.map that references I.map(x). I.refTo(x) and I.refFrom(x) can be used for SR deduplicated backup copy deletion, migration or other purposes as more fully described below.

Further in step 164, SRF control module 142 sets variable n to −1 and variable m to 0. Variable n is used during the deduplication process to track data blocks that are contained in backup copy I(x). Variable m is used to track data blocks that are stored in I.data(x).

In step 166, SRF control module 142 increments n by 1 and creates a new entry n in I.map(x). Eventually, I.map(x) will contain an entry for each data block of backup copy I(x), and each entry will contain a pointer that directly or indirectly identifies a location in backup storage 132 where a respective data block can be found. In step 170, hash value generator module 140 calculates a hash value K as a function of the data within block n of backup copy I(x). This hash value K can be used to determine whether block n is duplicated in backup storage 132. Hash value K and its corresponding data block n is provided to SRF control module 142, which in turn generates and sends a look-up request to SRM control module 144 that contains hash value K, I.data(x).ID, which is the identity of I.data(x), and the current value of m.

With continuing reference to FIGS. 2-4, FIG. 5 is a flow chart illustrating relevant aspects of process performed in response to SRM control module 144 receiving a look-up request from SRF module 110. In step 196, SRM control module 144 references hash table 118 using the hash value K of the look-up request. FIGS. 2 and 3 illustrate a graphical representation of an example hash table 118. As shown, hash table 118 includes a plurality of entries. Each entry z includes a unique hash value HV(z), and a pointer P(z), which includes I.data(z).ID, the identity of data object I.data(z) that stores data blocks, and an offset block number which represents the block within I.data(z) where a particular data block can be found. For example, entry 300 includes a unique hash value HV300, I.data1.ID (i.e., the identification of I.data1), and offset block number 4 that defines a block position within I.data1. As an aside, hash value generator module 140 previously calculated hash value HV300 based upon the data contained within the $4^{th}$ data block from the starting address of I.data1.

Returning to FIG. 5, SRM control module 144 forwards a copy of hash value K of the look-up request to hash value compare module 146, which in turn accesses hash table 118 and compares hash values contained therein. If a match is identified, then data block n is duplicated in backup storage 132 and contained in a data object I.data(y). In this situation, hash value compare module 146 instructs SRM control module 144 to generate a reply in step 202 that includes the identification I.data(y).ID and the offset number from the entry with the matching hash value. If K does not match a hash value of an entry within hash table 118, data block n is not duplicated in backup storage 132. In this situation, hash value compare module 146 instructs SRM control module 144 to add a new entry in hash table 118, which includes the contents of the look-up request (i.e., K, I.data(x).ID, and m). SRM control module 144 also instructs SRM control module 144 to send a reply to SRF control module 142 indicating that no match for K was found in hash table 118.

Figure 6:
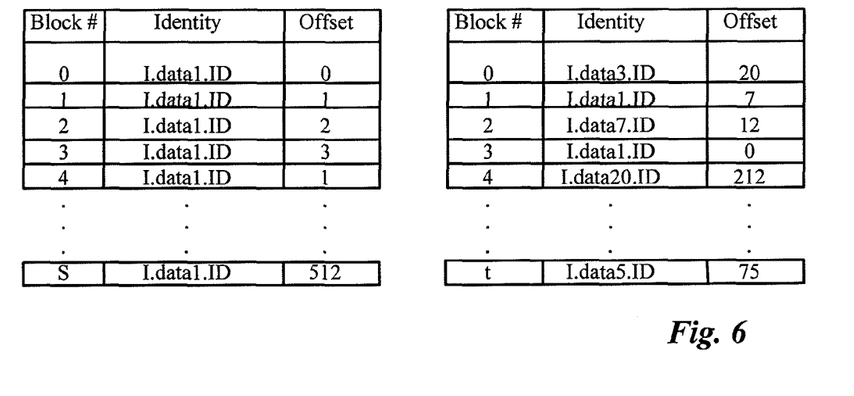
FIG. 6 graphically illustrates example I.map objects that may be employed in the system of FIG. 2.

Returning back to the process shown in FIG. 4, SRF control module 142 analyzes the reply from SRM control module 144. If the reply includes a pointer (i.e., an I.data(y).ID and block offset within I.data(y)), then the pointer is stored within entry n of I.map(x) shown in step 184. FIG. 6 graphically illustrates several examples of I.maps, each one of which was created during deduplication of a backup copy. In optional step 186, SRF control module 142 adds I.data(y).ID, the identify I.data(y), to I.refTo(x) if I.data(y).ID is not already contained in I.refTo(x). In optional step 190, SRF control module 142 accesses I.refFrom(y) and adds I.data(x).ID, if not already contained in I.refFrom(y). SRF module 110 may need retrieve I.refFrom(y) from backup storage 132 if not already contained in local memory 150.

If the reply from SRM control module 144 indicates K does not match an entry in hash table 118, then in step 176 SRF control module 142 appends data block n to the end of I.data (x). Thereafter, SRF control module 142 stores a pointer, which in the illustrated example consists of I.data(x).ID and block number m, in entry n of I.map(x). In response to implementing either step 180 or 184, entry n of I.map(x) contains a pointer that directly or indirectly identifies the location of a copy of block n in backup storage 132. Variable m is then incremented by 1.

Figure 8:
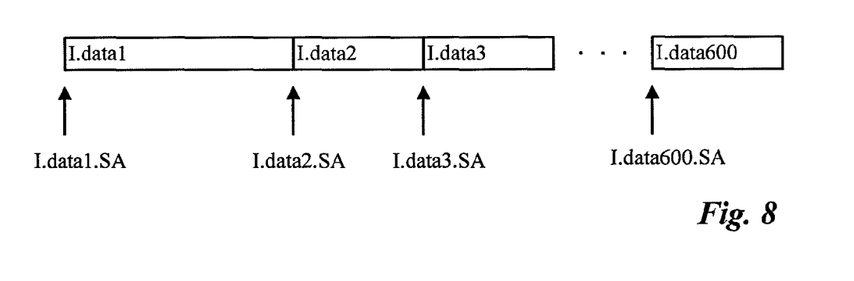
FIG. 8 graphically illustrates an example backup storage space that stores I.data objects.

In response to step 190 or step 182, SRF control module 142 determines whether block n was the last block of backup copy I(x) to be processed in accordance with the procedure of FIG. 4. If not, n is incremented in 166, a new entry n is created for I.map(x), and step 170 is repeated. Otherwise, the deduplication process has completed, and SRF control module 142 forwards I.data(x), I.map(x), I.refTo(x), and I.RefFrom(x) to backup system 130 for storage in backup storage 132. FIG. 8 illustrates a graphical representation of the backup storage space that contains the various instances of I.data(x) and their respective starting addresses I.data(x).SA. I.data(x) and I.map(x) can be referred to as an SR deduplicated backup copy.

Figure 7:
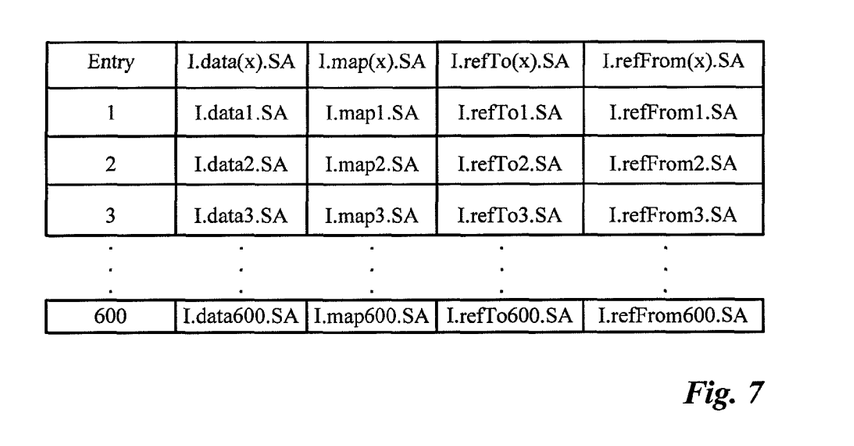
FIG. 7 graphically illustrates an example catalog C employed that may be employed in the system of FIG. 2

SRF control module 142 also creates a new entry within catalog C. Each entry x of catalog C contains pointers or starting addresses that directly or indirectly identify locations in backup storage 132 where I.data(x), I.map(x), I.refTo(x) and I.refFrom(x) can be found and later retrieved if needed. FIG. 7 illustrates a graphical representation of an example catalog C. After updating entry x of catalog C, SRF control module 142 reverts to a wait state in step 162 as shown in FIG. 4, and will remain in this state until the next backup operation.

Figure 9:
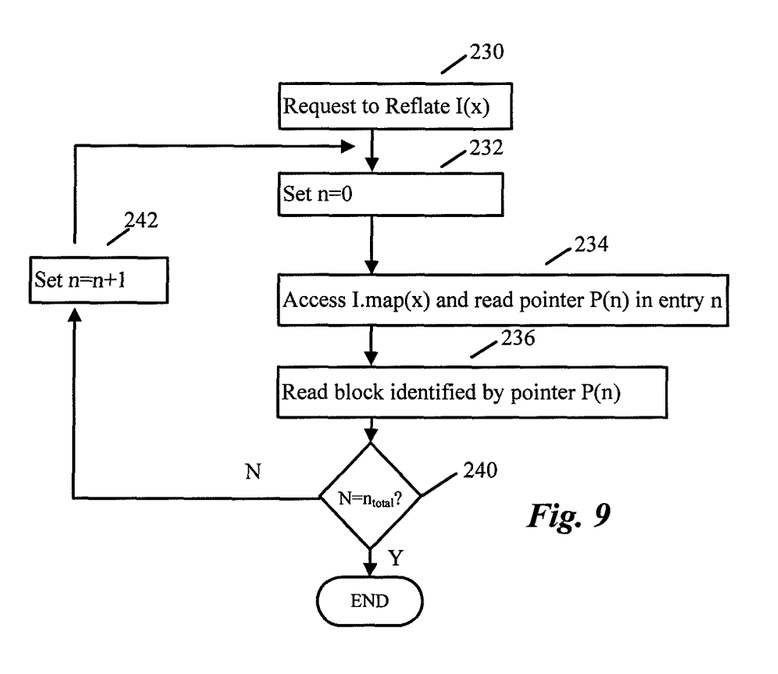
FIG. 9 is a flow chart that illustrates relevant aspects of a process implemented by a computer system in FIG. 2.

As noted above, SRF module 110 can recreate a backup copy I(x) by reflating a corresponding SR deduplicated backup. The recreated backup copy I(x) can be used by B/R module 108 to restore file system F, or a portion thereof, to a prior data state. FIG. 9 illustrates relevant aspects of an example reflation process that can be implemented by an SRF module such as SRF module 110. FIG. 9 will be described with reference to SRF module 110, it being understood that other SRF modules can implement the example process.

The reflation process begins after SRF control module 142 receives a request for backup copy I(x), or a select portion thereof, from B/R module 108. In step 232, SRF control module 142 sets variable n to 0. When only a select portion of backup copy I(x) is requested, variable n could be set to a particular block number that identifies the first block of a selected backup copy. However, for purposes of explanation only, FIG. 9 will be described with reference to initiating n at 0.

SRF control module 142 retrieves catalog C from backup storage 132 if catalog C is not already contained in local memory 150. SRF control module 142 accesses catalog C with x, an identity of the backup copy sought by B/R module 108, to retrieve I.map(x) from backup storage 132 if I.map(x) is not already contained in local memory 150. At step 234, SRF control module 142 accesses I.map(x) and reads pointer P(n) (i.e., I.data(n).ID and block number) of entry n therein. The pointer directly or indirectly identifies a location of backup storage 132 that stores a corresponding data block. Once retrieved, the data block is returned to the B/R system 108 as block n of recreated backup copy I(x). Thereafter, SRM module 112 determines whether the last data block of recreated backup copy I(x) has been retrieved for B/R module 108. If not, n is incremented in step 242 and step 234 is repeated. Otherwise, the process ends.

As seen in FIG. 9, neither SRM module 112 nor hash table 118 is employed in the reflation process. Data of the SR deduplicated backup copy need not flow through SRM module 112 in order to recreate the backup copy I(x). The process can be implemented by SRF module other than SRF module 110. For example, system 100 of FIG. 2 includes a secondary media server 252 coupled to a secondary storage system 254, the combination of which can service transaction requests received from client computer systems if primary media server 102 and/or primary storage system 104 fail as a result of hardware or software errors. Secondary media server 252 includes a B/R module 258 in data communication with SRF module 260, which is substantially similar to SRF module 110. SRF module 260 can reflate an SR deduplicated backup copy using the process shown in FIG. 9, the result of which can be used by B/R module 258 to recreate file system F on secondary storage 254. Once file system F is created, secondary media server 252 can respond to client computer system transaction requests that involve file system F.

Businesses usually maintain a limited number of backup copies in backup storage. When the number of backup copies exceeds this number, older backup copies are deleted. Similarly, older SR deduplicated backup copies can be deleted from backup storage 132 in order to free up storage space therein. However, an SR deduplicated backup copy should not be deleted from backup storage 132 if the SR deduplicated backup copy is referenced by another SR deduplicated backup copy. Stated differently, if a first SR deduplicated backup copy is referenced by a second SR deduplicated backup copy, the second SR deduplicated backup copy cannot be fully reflated in accordance with the process shown in FIG. 9 if the first SR deduplicated backup copy, including its I.data, has been deleted.

SRF control module 142 can prevent premature deletion of an SR deduplicated backup copy using I.refFrom(x). In response to a request to delete a backup copy I(x), SRF control module 142 updates I.map(x) to show that the corresponding SR deduplicated backup copy, including I.data(x), has been logically deleted. To B/R module 108, backup copy I(x) appears to have been deleted. However SRF control module 142 will not physically delete I.data(x) until all references to it have been removed (i.e., I.refFrom(x) is empty). SRF control module 142 accesses I.refTo(x) and reads each I.data(y).ID listed therein. For each listed I.data(y).ID, SRF control module 142 accesses the corresponding I.map(y) to determine if it has been logically deleted. If I.map(y) has been logically deleted, SRF control module 142 removes I.data(y).ID from I.refFrom(x). SRF control module 142 will physically delete I.data(x) from backup storage 132 only when I.refFrom(x) is empty.

As noted above, an SR deduplicated backup copy can be migrated from backup storage 132 to another storage system, such as storage 262 shown in FIG. 2, while in the deduplicated state. SRF module 110 or any other SRF module can reflate this migrated SR deduplicated backup copy in accordance with the process shown in FIG. 9. However, before the migrated SR deduplicated backup copy can be reflated from the other storage system, the other storage system should preferably contain a copy of each I.data data object that is listed in I.refTo. Thus, migration of an SR deduplicated backup copy should include migration of each I.data that is referenced in I.refTo.

Figure 10:
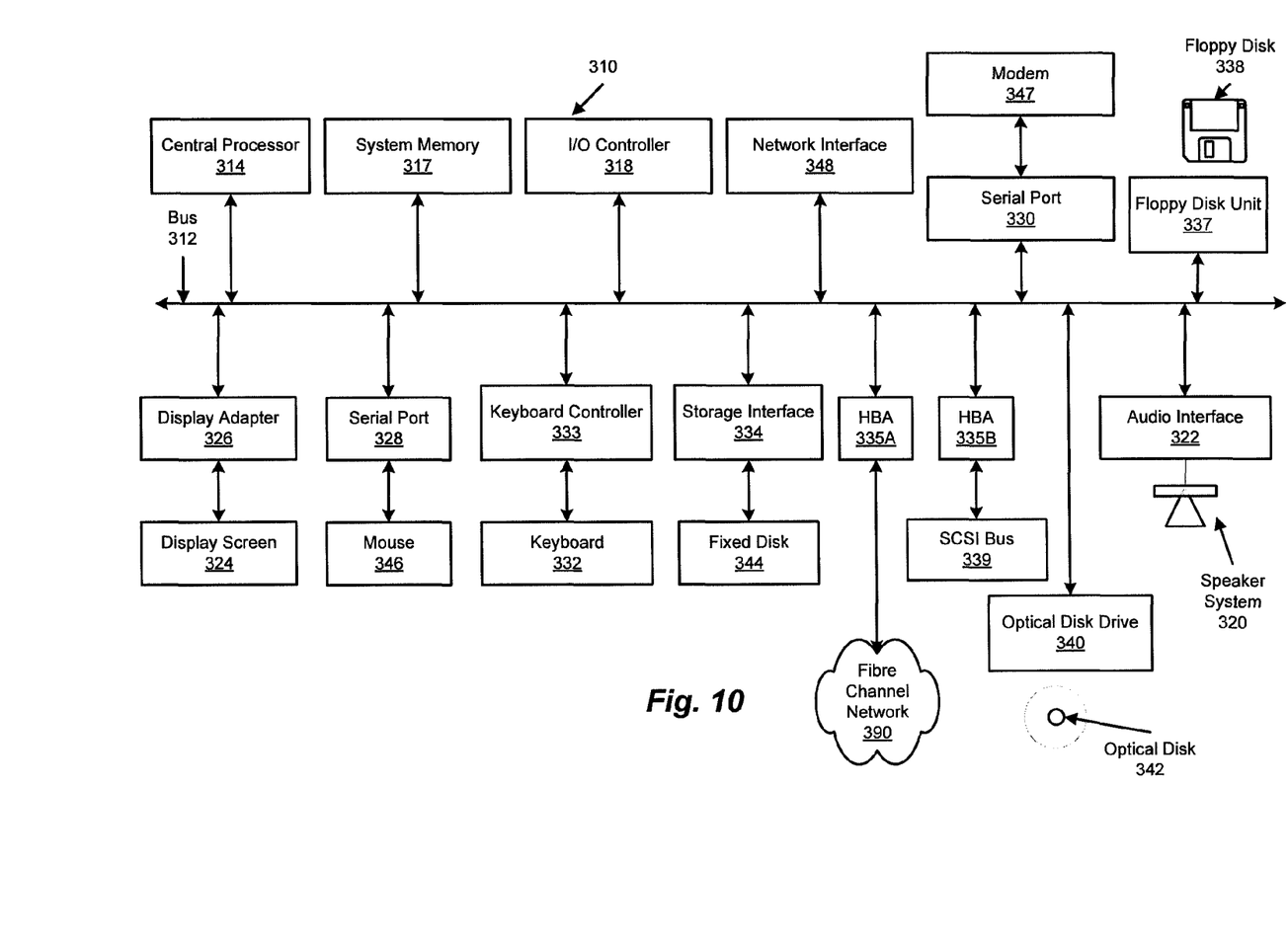
FIG. 10 is a block diagram of an example computer system that may be employed in the system of FIG. 2.

FIG. 10 depicts a block diagram of a computer system 310 suitable for implementing the present disclosure. Computer system 310 may be illustrative of various computer systems in the networked systems 10 or 100, such as a media servers 12, 102 or 252, storage servers 38, 134 or 264, or computer system 114. Computer system 310 includes a bus 312 which interconnects major subsystems of computer system 310, such as a central processor 314, a system memory 317 (typically RAM, but which may also include ROM, flash RAM, or the like), an input/output controller 318, an external audio device, such as a speaker system 320 via an audio output interface 322, an external device, such as a display screen 324 via display adapter 326, serial ports 328 and 330, a keyboard 332 (interfaced with a keyboard controller 333), a storage interface 334, a floppy disk drive 337 operative to receive a floppy disk 338, a host bus adapter (HBA) interface card 335A operative to connect with a Fibre Channel network 390, a host bus adapter (HBA) interface card 335B operative to connect to a SCSI bus 339, and an optical disk drive 340 operative to receive an optical disk 342. Also included are a mouse 346 (or other point-and-click device, coupled to bus 312 via serial port 328), a modem 347 (coupled to bus 312 via serial port 330), and a network interface 348 (coupled directly to bus 312).

Bus 312 allows data communication between central processor 314 and system memory 317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 310 are generally stored on and accessed via a computer readable medium, such as a hard disk drive (e.g., fixed disk 344), an optical drive (e.g., optical drive 340), a floppy disk unit 337, or other storage medium. Additionally, applications can be in the form of electronic signals modulated in accordance with the application and data communication technology when accessed via network modem 347 or interface 348.

Storage interface 334, as with the other storage interfaces of computer system 310, can connect to a standard computer readable medium for storage and/or retrieval of information, such as a fixed disk drive 344. Fixed disk drive 344 may be a part of computer system 310 or may be separate and accessed through other interface systems. Modem 347 may provide a direct connection to a remote server via a telephone link or to the Internet via an interne service provider (ISP). Network interface 348 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code for backing up data, restoring data, duduplicating data, etc, to implement the present disclosure can be stored in computer-readable storage media such as one or more of system memory 317, fixed disk 344, optical disk 342, or floppy disk 338. Memory 320 is also used for storing temporary variables or other intermediate information during the execution of instructions by the processor 310. The operating system provided on computer system 310 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

I claim:
1. A method comprising:
    deduplicating data, wherein the deduplicating comprises;
        calculating a first value as a function of data in an $n^{th}$ data block of a backup copy comprising a number, z, of data blocks, where n is a number from 1 to z;
        comparing the first value with each of a plurality of values in a plurality of entries, respectively, of a first data structure, the plurality of entries comprising a plurality of pointers, respectively, that identify a plurality of locations, respectively, where a plurality of data blocks, respectively, are physically stored in a storage system;

if the first value compares equally to a value contained in one of the plurality of entries of the first data structure, then a copy of the $n^{th}$ data block was previously stored in the storage system and as a result the method further comprises adding a pointer to the one entry to an $n^{th}$ entry of a second data structure, wherein the pointer identifies where the copy of the $n^{th}$ data block is stored in the storage system;

if the first value does not compare equally with any value contained in the plurality of entries of the first data structure, (1) storing the $n^{th}$ data block in the storage system, and (2) adding a first pointer to the $n^{th}$ entry of the second data structure, wherein the first pointer identifies where the $n^{th}$ data block is stored in the storage system;

storing the second data structure in the storage system after adding the pointer or the first pointer to the $n^{th}$ entry;

wherein the first pointer enables a computer system to retrieve the $n^{th}$ data block from the storage system without referencing the first data structure during data reflation, and wherein the pointer enables the computer system to retrieve the copy of the $n^{th}$ data block from the storage system without referencing the first data structure during reflation.

2. The method of claim 1, wherein a first computer system calculates the first value, a second computer system accesses the first data structure using the first value, and wherein the first and second computer systems are coupled together via a communication link.

3. The method of claim 2, further comprising the first computer system generating and sending a request to the second computer system via the communication link, the request comprising the first value.

4. The method of claim 2, wherein at least one other data block of the backup copy is stored as part of a first data object in the storage system, and wherein the method further comprises the first computer system recreating the backup copy using the first data object and the second data structure, wherein the first computer system recreates the backup copy independent of the second computer system.

5. The method of claim 1, wherein at least one data block of the backup copy is stored as part of a first data object in the storage system.

6. The method of claim 5, further comprising an act of migrating the first data object and the second data structure to a second storage system.

7. The method of claim 6, further comprising an act of recreating the backup copy using the first data object and the second data structure of the second storage system.

8. The method of claim 1, wherein the second data structure includes only pointers to data blocks stored in the storage system.

9. The method of claim 1, wherein
the first data structure is stored in a second storage system operably coupled to an appliance,
the appliance accesses the second storage system in order to deduplicate data, and
the appliance is separate from the first storage system.

10. The method of claim 9, wherein the appliance is not needed for the computer system to retrieve the $n^{th}$ data block from the storage system.

11. A non-transitory computer readable medium comprising program instructions, wherein the program instructions are executable by one or more processors to implement a method, the method comprising:
deduplicating data, wherein the deduplicating comprises;
calculating a first value as a function of data in an $n^{th}$ data block of a backup copy that comprises a number, z, of data blocks, where n is a number from 1 to z;
if the first value compares equally to a value contained in one of a plurality of entries of a first data structure, adding a pointer to the one entry to an $n^{th}$ entry of a second data structure, wherein the pointer identifies where a copy of the $n^{th}$ data block is physically stored in a storage system;
if the first value does not compare equally with any value contained in the plurality of entries of the first data structure, (1) storing the $n^{th}$ data block in the storage system, and (2) adding a first pointer to the $n^{th}$ entry of the second data structure, wherein the first pointer identifies where the $n^{th}$ data block is physically stored in the storage system;
storing the second data structure in the storage system after adding the pointer or the first pointer to the $n^{th}$ entry;
wherein the first pointer enables a computer system to retrieve the $n^{th}$ data block from the storage system without referencing the first data structure during reflation, and
wherein the pointer enables the computer system to retrieve the copy of the $n^{th}$ data block from the storage system without referencing the first data structure during reflation.

12. The non-transitory computer readable medium of claim 11, wherein the method further comprises comparing the first value with each of a plurality of values in the plurality of entries, respectively, of the first data structure, the plurality of entries comprising a plurality of pointers, respectively, that identify a plurality of locations, respectively, where a plurality of data blocks, respectively, are physically stored in the storage system.

13. The non-transitory computer readable medium of claim 11, wherein at least one data block of the backup copy is stored as part of a first data object in the storage system.

14. The non-transitory computer readable medium of claim 13, further comprising an act of recreating the backup copy using the second data structure and the first data object.

15. The non-transitory computer readable medium of claim 11, further comprising an act of generating and sending a request comprising the first value.

16. An apparatus comprising:
a first computer system coupled to a second computer system via a communication link, wherein:
the first computer system is configured to calculate a first value as a function of data in an $n^{th}$ data block of a backup copy that comprises a number, z, of data blocks, where n is a number from 1 to z;
the second computer system is configured to compare the first value with each of a plurality of values in a plurality of entries, respectively, of a first data structure, the plurality of entries comprising a plurality of pointers, respectively, that identify a plurality of locations, respectively, where a plurality of data blocks, respectively, are physically stored in a storage system;

if the first value compares equally to a value contained in one of the plurality of entries of the first data structure, the first computer system is configured to add a pointer to the one entry to an $n^{th}$ entry of a second data structure, wherein the pointer identifies where a copy of the $n^{th}$ data block is stored in the storage system;

if the first value does not compare equally with any value contained in the plurality of entries of the first data structure, the first computer system is configured to (1) store the $n^{th}$ data block in the storage system, and (2) add a first pointer to the $n^{th}$ entry of the second data structure, wherein the first pointer identifies where the $n^{th}$ data block is stored in the storage system;

the first computer system is configured to store the second data structure in the storage system after adding the pointer or the first pointer to the $n^{th}$ entry;

wherein the first pointer enables a computer system to retrieve the $n^{th}$ data block from the storage system without referencing the first data structure during reflation, and wherein the pointer enables the computer system to retrieve the copy of the $n^{th}$ data block from the storage system without referencing the first data structure during reflation.

17. The apparatus of claim 16, wherein the first computer system is configured to generate and send a request to the second computer system via the communication link, the request comprising the first value.

18. The apparatus of claim 16, wherein the first computer system is configured to store a first data object in the storage system, wherein at least one other data block of the backup copy is contained in the first data object, and wherein the first computer system is configured to recreate the backup copy using the first data object and the second data structure, wherein the first computer system is configured to recreate the backup copy independent of the second computer system.

19. The apparatus of claim 16, further comprising a third computer system configured to migrate the first data object and the second data structure from the storage system to a second storage system.

20. The apparatus of claim 19, further comprising a fourth computer system configured to recreate the backup copy using the first data object and the second data structure of the second storage system.

* * * * *

UNITED STATES PATENT AND TRADEMARK OFFICE
CERTIFICATE OF CORRECTION

Page 1 of 1

PATENT NO. : 9,075,532 B1
APPLICATION NO. : 12/766177
DATED : July 7, 2015
INVENTOR(S) : Bromley It is certified that error appears in the above-identified patent and that said Letters Patent is hereby corrected as shown below:

In the claims
Column 13
Line 5, Claim 1, insert: -- first -- immediately before "storage system"
Line 9, Claim 1, insert: -- first -- immediately before "storage system"
Line 14, Claim 1, insert: -- first -- immediately before "storage system"
Line 17, Claim 1, insert: -- first -- immediately before "storage system"
Line 21, Claim 1, insert: -- first -- immediately before "storage system"
Line 22, Claim 1, insert: -- first -- immediately before "storage system"
Line 26, Claim 1, insert: -- first -- immediately before "storage system"
Line 30, Claim 1, insert: -- first -- immediately before "storage system"
Line 45, Claim 4, insert: -- first -- immediately before "storage system"
Line 52, Claim 5, insert: -- first -- immediately before "storage system"
Line 60, Claim 8, insert: -- first -- immediately before "storage"

Signed and Sealed this
Third Day of May, 2016

Michelle K. Lee
*Director of the United States Patent and Trademark Office*